2,829,084

CERTAIN ALKYL-N(5-NITRO-2-THIAZOLYL) CARBAMATES AND PROCESS

Robert C. O'Neill, New York, N. Y., and Arthur J. Basso, Rahway, N. J., assignors to Merck & Co., Inc., Rahway, N. J., a corporation of New Jersey No Drawing. Application May 14, 1956
Serial No. 584,439

9 Claims. (Cl. 167—53.1)

This invention relates to carbamate derivatives of 2-amino-5-nitrothiazole. More particularly, it is concerned with alkyl-N-(5-nitro-2-thiazolyl) carbamates, processes for the preparation of these new products and new compositions containing these carbamates.

In accordance with the present invention, it is now found that the novel alkyl-N-(5-nitro-2-thiazolyl) carbamates of the formula:

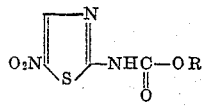

wherein R represents a methyl or ethyl group are particularly suitable in the treatment and prevention of enterohepatitis (blackhead) in turkeys.

Enterohepatitis is an extremely destructive disease occurring in turkey flocks and is caused by a protozoan organism called *Histomonas meleagridis*. This turkey disease represents a serious economic threat to the turkey raiser since the mortality rate in infected flocks may reach as high as 80–90%.

It is one object of the present invention to provide new alkyl-N-(5-nitro-2-thiazolyl)carbamates. Another object is to provide processes for the preparation of these new carbamate compounds. A further object is to provide new compositions containing these carbamates which are suitable for the treatment of turkey enterohepatitis. Other objects will be apparent from the detailed description of the invention hereinfter provided.

It has now been discovered that the alkyl-N-(5-nitro-2-thiazolyl) carbamates of the present invention can be produced by intimately contacting 2-amino-5-nitrothiazole with ethyl or methyl haloformates. This reaction can be shown structurally as follows:

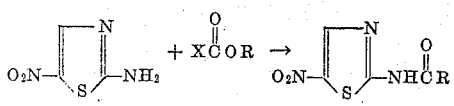

wherein X represents bromine or chlorine and R is methyl or ethyl.

This condensation is more readily effected at temperature above about 50° C. although lower temperatures can also be employed with correspondingly longer reaction times. It is preferred to carry out the reaction at a temperature within the range of about 80–100° C. since at temperatures within this range the reaction takes place rapidly and maximum yields of the desired product are obtained under optimum conditions.

During the above-described reaction the hydrogen halide is formed as a by-product and is preferably removed by evolution as a gas. Alternatively, the reaction can be carried out in the presence of an acid acceptor such as an inorganic or organic base. In general, an organic base such as pyridine, triethylamine, and the like are found to be most satisfactory for this purpose, although other bases can be similarly employed. Thus, the reaction is also conveniently effected by employing an excess of the starting material, 2-amino-5-nitrothiazole, in the reaction mixture.

The condensation of the 2-amino-5-nitrothiazole and the alkyl halo formate is most conveniently carried out in an inert organic solvent such as an aromatic hydrocarbon, for example, benzene, toluene, xylene, dioxane, ethylene dichloride, chlorobenzene, trichlorobenzene, and the like. Thus, the condensation is conveniently carried out by heating a slurry of the 2-amino-5-nitrothiazole and alkylchloroformate in xylene for about 3–4 hours. After completion of the reaction, the resulting reaction mixture is cooled and the precipitated carbamate is separated from the solvent. If desired, the product so obtained can be purified further by recrystallization from a suitable solvent such as methanol.

The following examples are presented as illustrative embodiments of the present invention:

EXAMPLE 1

*Preparation of methyl-N-(5-nitro-2-thiazolyl) carbamate*

A slurry consisting of 72.5 g. (0.5 mol) of 2-amino-5-nitrothiazole, 59.6 g. (0.55 mole) of methyl chloroformate and 1100 ml. of dry xylene was stirred at vigorous reflux for three and one-half hours. During this time hydrogen chloride was smoothly expelled through the reflux condenser. The slurry of crude product was chilled and filtered with vacuum. Purification of the carbamate was effected by recrystallization from methanol.

The pure methyl-N-(5-nitro-2-thiazolyl) carbamate decomposed at 235–8° C. with considerable preliminary shrinking and browning.

EXAMPLE 2

*Preparation of ethyl-N-(5-nitro-2-thiazolyl) carbamate*

To 1000 ml. of dry xylene was added 72.5 g. (0.5 mol) of 2-amino-5-nitrothiazole, and 59.6 g. (0.55 mol) of ethyl chloroformate This mixture was vigorously stirred at reflux for three and one-half hours, chilled in ice, and filtered with vacuum. The crude dry product was recrystallized from ethanol. Ethyl-N-(5-nitro-2-thiazolyl) carbamate deposited as pale yellow leafs and platelets from ethanol, M. P. 196–7° C. to a clear yellow melt.

The processes for the preparation of methyl and ethyl-N-(5-nitro-2-thiazolyl) carbamate shown in the foregoing examples can also be carried out in the same manner using methyl or ethyl bromoformate in place of the chloroformate esters.

The methyl or ethyl-N-(5-nitro-2-thiazolyl) carbamates are very useful in treating turkeys infected with blackhead, and as prophylactics in preventing the infection of turkey flocks. These products are most conveniently administered orally by suspending or dispersing the carbamate compounds in the feed or drinking water of the turkeys. The concentration of the carbamates in the feed or drink will depend upon the severity of the infection, age of the turkeys, etc. In general, it is found that a concentration of the therapeutic agent of about 0.02% to about 0.2% in the feed or drink is satisfactory. Amounts of the therapeutic agents within this range show no toxic effects and do not disturb the normal growth and well being of the turkeys.

The alkyl-N-(5-nitro-2-thiazolyl) carbamates of the present invention are especially useful in treating and preventing turkey blackhead infections since they form water soluble alkali metal salts and can therefore be conveniently administered to turkey flocks in the drinking water.

Various changes and modifications in the procedures herein disclosed will occur to those skilled in the art, and to the extent that such changes and modifications are em-

What is claimed is:
1. A compound from the group consisting of methyl-N-(5-nitro-2-thiazolyl) carbamate and ethyl-N-(5-nitro-2-thiazolyl) carbamate.
2. Methyl-N-(5-nitro-2-thiazolyl) carbamate.
3. Ethyl-N-(5-nitro-2-thiazolyl) carbamate.
4. The process which comprises intimately contacting 2-amino-5-nitrothiazole with an alkyl haloformate of the formula:

wherein R represents a substituent from the group consisting of methyl and ethyl and X represents a halo substituent from the group consisting of chlorine and bromine.
5. The process which comprises reacting 2-amino-5-nitrothiazole with methyl chloroformate to produce methyl-N-(5-nitro-2-thiazolyl) carbamate.
6. The process according to claim 5 in which the reaction is carried out at a temperature of about 50–100° C.
7. The process which comprises intimately contacting 2-amino-5-nitrothiazole with ethyl chloroformate to produce ethyl-N-(5-nitro-2-thiazolyl) carbamate.
8. The process according to claim 7 in which the reaction is carried out at a temperature between about 50° C.–100° C.
9. A composition of matter for the control of enterohepatitis which comprises a member from the group consisting of turkey feed and turkey drinking water containing between about 0.02 and 0.20% of a compound from the group consisting of methyl-N-(5-nitro-2-thiazolyl) carbamate and ethyl-N-(5-nitro-2-thiazolyl) carbamate.

References Cited in the file of this patent

UNITED STATES PATENTS

| | | |
|---|---|---|
| 2,531,756 | Waletzky et al. | Nov. 28, 1950 |
| 2,547,677 | Waletzky | Apr. 3, 1951 |
| 2,573,656 | Steahly | Oct. 3, 1951 |
| 2,574,155 | Parker et al. | Nov. 6, 1951 |
| 2,631,963 | Parker et al. | Mar. 17, 1953 |
| 2,690,443 | Parker et al. | Sept. 28, 1954 |

OTHER REFERENCES

Curry et al.: J. Am. Chem. Soc., vol. 73, pp. 5043–6